Figure 1:
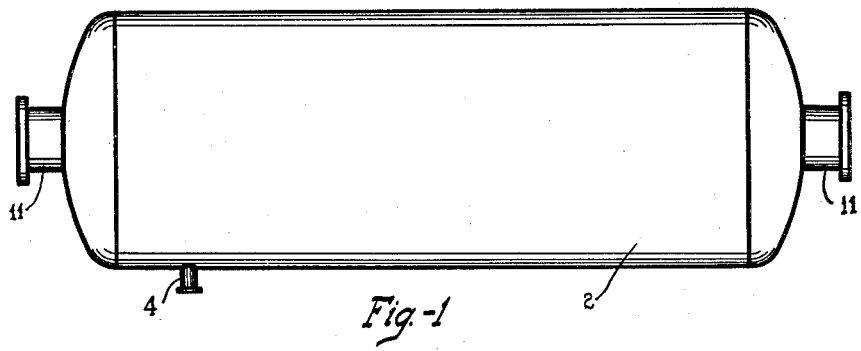

May 12, 1936.    A. KIDD    2,040,140

METHOD OF WELDING TUBULAR CONNECTERS

Filed Aug. 1, 1934

INVENTOR
Alexander Kidd
BY
Virgil F. Davies
ATTORNEY

UNITED STATES PATENT OFFICE 2,040,140

METHOD OF WELDING TUBULAR CONNECTERS

Alexander Kidd, Allwood, N. J., assignor to M. W. Kellogg Company, New York, N. Y., a corporation of Delaware Application August 1, 1934, Serial No. 737,867

5 Claims. (Cl. 29—148.2)

This invention relates in general to electric arc welding and in particular to a method for welding tubular connecters to the walls of pressure vessels.

It is the usual present practice when welding manways, nozzles, and the like, to the walls of pressure vessels, to form the component parts of the welding groove, or grooves, when a compound groove is used, by reducing the end of the connecter for a distance about equal to the thickness of the vessel wall and by chamfering the sides of the hole in the vessel wall for substantially the full thickness of the vessel wall. Thus when the reduced end of the connecter is positioned in the hole of the vessel the welding groove, or grooves, is disposed at an oblique angle to the face of the vessel wall, and opens in the intersection of the vessel wall and the connecter wall. Because of its position the groove is not very accessible to the usual welding electrode and welding therein is difficult. The difficulty is very much increased when the connecter is short and flanged. For this reason the groove is always much wider than the stresses, which it is to resist in service, require, consequently the cost of welding is excessive. The cost of the welding is also much more than it need be as the weld is always at least as deep as the thickness of the vessel wall.

By reason of the stresses set up during the contraction of the weld metal it is necessary in order to prevent the development of cracks in the weld, the connecter walls, and the vessel walls to bring the major portion of the reduced end of the connecter to the thickness of a thin welding dam. The machining required to do this also materially increases the cost of the welding. The welds of the present practice are also not satisfactory for the reason that because of their position they cannot be examined by the X-ray and none of the benefits derived from an accurate examination can be had.

I have found that the welding of connecters to heavy walled pressure vessels can be carried out more easily and more cheaply than is now possible and that a more efficient weld can be produced that can readily be examined by the X-ray. In accordance with my invention the top of the vessel wall surrounding the hole and the bottom of the connecters are formed into the component parts of the welding groove, or grooves, when compound grooves are used, in such a manner that when the connecter is positioned on the vessel a welding groove is defined that is generally parallel with the vessel walls and is substantially at right angles to the axis of the connecter. The groove thus defined is easily accessible for welding even when the connecter is short flanged, consequently in its design the stresses which it must resist in service are the only factors that determine its width. The depth of the groove thus defined never exceeds the thickness of the connecter walls.

When the connecter to be welded is of small diameter I prefer a single groove with a minimum of metal in its bottom wall, such bottom wall either by itself serving as the chilling ring or I may employ a separate chilling ring. When the diameter of the connecter is large enough to render its inner walls accessible to a welding rod I may employ a single groove or any of the well known compound grooves and carry on the welding from both sides of the walls of the connecter. In any case, after the groove, or grooves, are formed, they are filled by depositing fusing weld metal in them by means of the electric arc. The completed weld, because of its position, can be thoroughly examined by means of the X-ray.

Figures 2, 4:
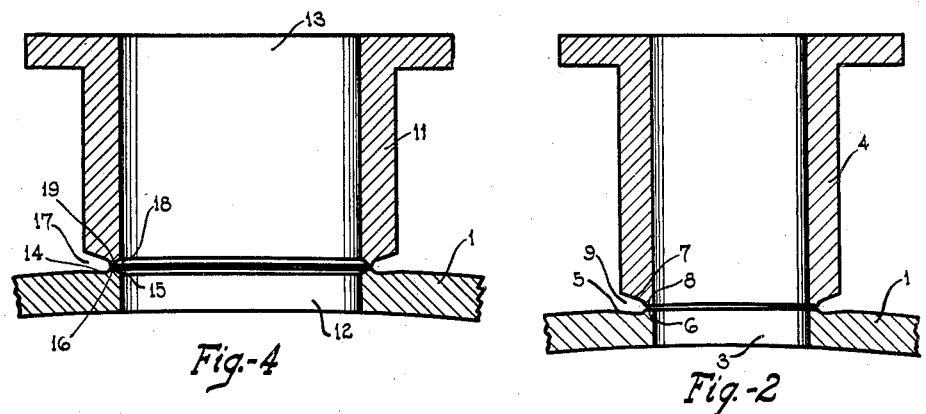
Figures 3, 5:
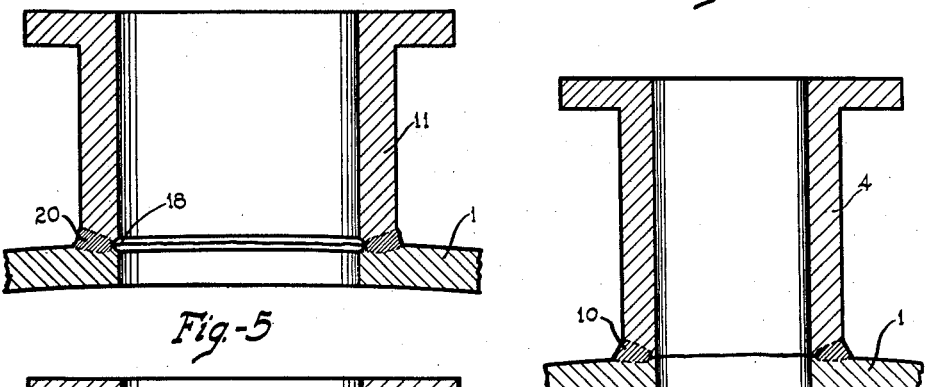
Figure 6:
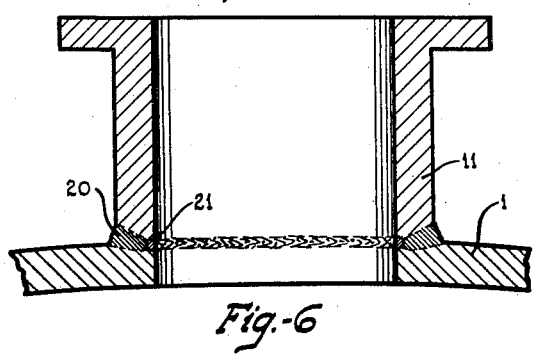

The further objects and advantages of the invention can be better appreciated from a consideration of the following description thereof taken with the accompanying drawing in which, Fig. 1 is a plan view of a pressure vessel with connecters joined thereto, Fig. 2 is a sectional view showing the vessel walls and the connecter end prepared for welding, Fig. 3 is a sectional view similar to Fig. 2 showing the completed weld, Fig. 4 is a sectional view similar to Fig. 2 showing another type of groove, Fig. 5 is a sectional view similar to Fig. 4 with the main welding groove filled with weld metal, and Fig. 6 is also a sectional view similar to Fig. 4 showing both grooves filled with weld metal.

The thick wall 1 of pressure vessel 2 is perforated to provide a hole 3 of substantially the same diameter as the inside diameter of connecter 4. Connecter 4 is a nozzle of comparatively small diameter, but it is to be understood that the invention is not limited to such a nozzle and may be equally well practiced with all types of connecters whatever their diameters may be.

After hole 3 is formed, the top surface of wall 1 is chamfered to produce shallow annular recess 5. The metal immediately around hole 3 is not removed so that a projection 6 remains. The end of connecter 4 is then machined to produce a sharp taper 7 that ends in a projection 8. Recess 5 is preferably very shallow as shown and the main portion of the groove 9 is defined by taper 7 and lip 8. Preferably recess 5 should not exceed ⅜ of an inch in depth. In arriving at the width of groove 9 it is only necessary to consider the stresses which the weld must withstand during service, as groove 9, being substantially parallel to the surface of wall 1, is entirely accessible for welding.

When the end of connector 4 is machined it is placed on wall 1 so that projection 8 rests on projection 6. If desired connecter 4 may be tack welded at a few points to fix it in position and to facilitate the filling of groove 9. Groove 9 is filled with fusing weld metal deposited from a fusible electrode by means of an electric arc to form weld 10. Though I prefer to fill in groove 9 by electric arc welding the invention may be satisfactorily carried out by gas welding.

In carrying out the invention as above described projections 6 and 8 may be made of such thickness that they will act as a chilling ring, or they may be made too thin to serve this purpose, in the latter case a separate chilling member, not shown, may be used in the manner well known to the art.

The particular form of groove shown need not be strictly adhered to as any of the well-known welding grooves will be found suitable. However it is important that the part of the groove formed in wall 1 be kept to a minimum depth otherwise some of the advantages of the invention will not be obtained.

When a large diameter connector 11, see Figs. 4, 5 and 6, is to be welded to thick walled pressure vessel 2 the vessel wall 1 is perforated to form a hole 12 of substantially the same diameter as passageway 13 defined by connector 11. The wall 1 around the hole 12 is then chamfered to provide shallow recesses 14 and 15 separated by projection 16. Recesses 14 and 15 should be very shallow as before, preferably they should not exceed ⅜ of an inch in depth. The end of connector 11 is then machined to form the other component parts of welding grooves 17 and 18. Although a compound U-shaped welding groove is shown it is to be understood that any of the standard forms of welding grooves may be used.

When the machining is completed connecter 11 is placed in position with projection 19 resting on projection 16. Main welding groove 17 is then filled with fusing weld metal from a destructible welding electrode by means of the electric arc and main weld 20 is produced. After weld 20 is completed secondary groove 18 is also filled with fusing weld metal to produce secondary weld 21. Though I prefer to form welds 20 and 21 by electric arc welding, they may be produced by gas welding. While compound welds are preferred when welding large diameter connecters 11 single welds such as are described in connection with Figs. 2 and 3 may also be used.

It is to be noted that the necks of connecters 4 and 11 are so positioned that they serve to reinforce the walls of vessel 1 adjacent holes 3 and 12. The reinforcement thus obtained is in most cases sufficient so that further deposition of metal at the juncture of connecters 4 and 11 and wall 1 is unnecessary. However, when such additional metal is deposited it not only serves to reinforce wall 1 but also reinforces welds 10 and 20. This result is not attained by the prior art.

I claim:

1. The process of welding tubular connecters to the walls of pressure vessels which comprises perforating the vessel to form a hole therein of a diameter substantially equal to the diameter of the passageway in said connecter, chamfering the outside face of the vessel wall around said hole to form thereon a short projection adjacent the walls of said hole, reducing the end of the connecter to form a projection thereon adjacent the inner walls thereof, the inner and outer diameters of the first of said projections being substantially the same as the inner and outer diameters of the second of said projections, positioning said connecter on the vessel wall with said second projection on said first projection whereby the inner walls of said connecter are in line with the walls of said hole, and depositing fusing weld metal between the end of said connecter and the vessel wall to weld the end of said connecter and the vessel wall together.

2. The process of welding tubular connecters to the walls of pressure vessels which comprises perforating the vessel walls to form a hole therein of a diameter substantially equal to the diameter of the passageway in said connecter, chamfering the outside face of the vessel wall around said wall to form thereon one component part of the welding groove, said one component part being in the form of a shallow annular recess and being separated from the sides of said hole by a short projection, forming the end of the connecter into the other component part of the welding groove, said other component part including the major portion of the width of the welding groove and being separated from the inner walls of the connecter by said projection, the inner and outer diameters of the first of said projections being substantially the same as the inner and outer diameters of the second of said projections, positioning said connecter on the vessel wall with said second projection on said first projection to align the walls of said hole and the inner walls of said connecter and to define the welding groove between said face of the vessel wall and the end of the connecter, and filling the welding groove by depositing fusing weld metal therein.

3. The process of welding tubular connecters to the curved walls of pressure vessels which comprises perforating the vessel wall to form a hole therein, chamfering the outside face of the vessel wall around said hole to form thereon one component part of the welding groove, said one component part including a short projection adjacent the walls of said hole and being disposed substantially normal to the axis of said hole, forming the end of the connecter into the other component part of the welding groove so as to include a projection at the end thereof adjacent the inner walls thereof, said other component part being disposed substantially normal to the axis of said connecter, positioning the connecter on the vessel wall with the second projection on said first projection to define between said face of the vessel wall and the end of the connecter the welding groove, said welding groove thus defined being generally parallel with said face of the vessel wall, and depositing fusing weld metal in said welding groove to weld said connecter and the vessel wall together.

4. The process of welding tubular connecters to the walls of pressure vessels which comprises perforating the vessel wall to form a hole therein of a diameter substantially equal to the diameter of the passageway in said connecter, chamfering the outside face of the vessel wall around said hole to form thereon a shallow recess and a short projection adjacent the walls of said hole, reducing the end of the connecter to form thereon a recess and a projection adjacent the inner walls thereof, positioning the connecter on said wall concentric with said hole to define the welding groove between said face of the vessel wall and the end of the connecter, the chamfering of said face and the reducing of the end of the connecter being such that the welding groove thus defined is of a width not substantially in excess of the thickness of the metal required to withstand the service stresses, and filling in said groove by depositing therein fusing weld metal.

5. The process of welding tubular connecters to the walls of pressure vessels which comprises perforating the vessel wall to form a hole therein of a diameter substantially equal to the diameter of the passageway in said connecter, chamfering the outside face of the vessel wall around said hole to form thereon a shallow annular recess which is separated from adjacent walls of said hole by a short projection, reducing the end of the connecter to form thereon a recess and a projection adjacent the inner ends thereof, said first projection having inner and outer diameters substantially equal to the inner and outer diameters of said second projection, positioning said connecter on the vessel wall with said second projection on said first projection to align the inner walls of said connecter with the walls of said hole and to define the welding groove, the chamfering of said face and the reducing of the end of the connecter being such that the welding groove thus defined is of a width not substantially in excess of the thickness of the metal required to withstand the service stresses, and depositing fusing weld metal in the welding groove to unite the connecter and the vessel walls.

ALEXANDER KIDD.